(12) United States Patent
Holtz et al.

(10) Patent No.: US 11,392,418 B2
(45) Date of Patent: Jul. 19, 2022

(54) ADAPTIVE PACING SETTING FOR WORKLOAD EXECUTION

(71) Applicant: International Business Machines Corporation, Armonk, NY (US)

(72) Inventors: Juergen Holtz, Pleidelsheim (DE); Qais Noorshams, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 133 days.

(21) Appl. No.: 16/797,348

(22) Filed: Feb. 21, 2020

(65) Prior Publication Data

US 2021/0263778 A1    Aug. 26, 2021

(51) Int. Cl.
*G06F 9/50* (2006.01)
*G06F 9/4401* (2018.01)
*G06F 9/38* (2018.01)

(52) U.S. Cl.
CPC .......... *G06F 9/5061* (2013.01); *G06F 9/3851* (2013.01); *G06F 9/4403* (2013.01)

(58) Field of Classification Search
CPC ..... G06F 9/3851; G06F 9/4403; G06F 9/5061
See application file for complete search history.

(56) References Cited

U.S. PATENT DOCUMENTS

| | | | |
|---|---|---|---|
| 5,748,516 A * | 5/1998 | Goddard | G06F 7/483 708/497 |
| 5,991,792 A | 11/1999 | Nageswaran | |
| 6,098,158 A | 8/2000 | Lay | |
| 6,138,234 A * | 10/2000 | Lee | G06F 9/4405 713/2 |
| 7,219,241 B2 | 5/2007 | Cooper | |
| 7,237,242 B2 | 6/2007 | Blythe | |
| 7,490,254 B2 | 2/2009 | Clark | |
| 7,526,661 B2 | 4/2009 | Nakajima | |
| 7,590,839 B2 | 9/2009 | Van Der Veen | |
| 8,572,612 B2 | 10/2013 | Kern | |

(Continued)

FOREIGN PATENT DOCUMENTS

EP    3518100 A1    7/2019

OTHER PUBLICATIONS

IBM, "IPL and booting", printed Jan. 28, 2020, 3 pages, <https://www.ibm.com/support/knowledgecenter/en/linuxonibm/com.ibm.linux.z.ludd/ludd_c_ipl_vs_boot.html>.

(Continued)

*Primary Examiner* — Jorge A Chu Joy-Davila
(74) *Attorney, Agent, or Firm* — Jared L. Montanaro

(57) ABSTRACT

A computer system may initialize one or more workloads. The computer system may operate in a boost mode and a regular mode. The boost mode may include an adjustment of a pacing setting and an adjustment of group availability targets for executing the one or more workloads. The computer system may identify that the boost mode is enabled during a system start of the computer system. The computer system may identify that the pacing setting is operating in the regular mode. The computer system may dynamically increase the pacing setting. The increase of the pacing setting may enable an increased processor utilization of the computer system by the one or more workloads. The increased processor utilization may generate a concurrent processing of the one or more workloads. The computer system may determine an end of the boost mode and reset the pacing setting.

15 Claims, 12 Drawing Sheets

(56) References Cited

U.S. PATENT DOCUMENTS

| | | | |
|---|---|---|---|
| 8,756,609 B2 | 6/2014 | Dasgupta | |
| 9,235,474 B1* | 1/2016 | Petri | G06F 11/1417 |
| 10,198,271 B2 | 2/2019 | Lv | |
| 10,228,952 B2 | 3/2019 | Mese | |
| 2005/0015215 A1* | 1/2005 | Zhang | G06F 9/4418 |
| | | | 702/119 |
| 2005/0034002 A1* | 2/2005 | Flautner | G06F 1/329 |
| | | | 713/322 |
| 2007/0162736 A1* | 7/2007 | Wu | G06F 9/4401 |
| | | | 713/2 |
| 2007/0260867 A1* | 11/2007 | Ethier | G06F 9/4418 |
| | | | 713/2 |
| 2009/0307696 A1 | 12/2009 | Vals | |
| 2010/0082890 A1* | 4/2010 | Heo | G06F 9/4406 |
| | | | 711/103 |
| 2010/0268912 A1 | 10/2010 | Conte | |
| 2011/0035572 A1* | 2/2011 | Akizuki | G06F 9/3857 |
| | | | 712/E9.016 |
| 2011/0067029 A1 | 3/2011 | Wolfe | |
| 2011/0225410 A1 | 9/2011 | Hung | |
| 2012/0047358 A1 | 2/2012 | Chung | |
| 2013/0111199 A1* | 5/2013 | Watanabe | G06F 9/4406 |
| | | | 713/1 |
| 2014/0281618 A1* | 9/2014 | Sultenfuss | G06F 1/30 |
| | | | 713/323 |
| 2017/0075697 A1* | 3/2017 | Wei | G06F 9/44521 |
| 2019/0243663 A1 | 8/2019 | Hu | |
| 2019/0290909 A1 | 9/2019 | Ghosh | |
| 2019/0310859 A1* | 10/2019 | Kopfstedt | G06F 3/0661 |
| 2020/0005424 A1 | 1/2020 | Appu | |
| 2020/0372346 A1* | 11/2020 | Wu | G06N 3/04 |
| 2021/0064470 A1* | 3/2021 | LeCrone | G06F 9/4401 |

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs.

* cited by examiner

100

Upon determining that boost mode is enabled and that pacing is regular dynamically increasing the pacing setting.
102

Upon determining end of boost mode re-setting the pacing setting.
104

ADAPTIVE PACING SETTING FOR WORKLOAD EXECUTION

BACKGROUND

The disclosure relates generally to managing dynamically available resources of a computer system, and more specifically, to accelerating a start procedure of a computer system.

The capacity of computer systems being installed, either in cloud computing centers, or in on-premise computing centers, continuously grows. However, in some cases, the complete computer power of very large computing systems, also known as mainframe computers, may be constantly required. Thus, compute power on demand has been implemented allowing a dynamic increase, or decrease, of available computing resources depending on specific trigger signals.

Further, system downtimes have become increasingly costly (e.g., by way of computing resources, etc.) for users in which a 24/7 availability is the norm. In particular, when restoring from maintenance scenarios, the main focus is on minimizing the time to start, or shutdown, a computer system. During regular computing hours the full capacity of the computing system may not be used. Instead, the full capacity may only be used for dedicated tasks, e.g., a monthly consolidation of business data. However, this may also involve additional licensing costs.

There are some disclosures related to a computer-implemented method for increasing the flexibility of using spare capacity of computing systems.

Document US 2012/0047358 A1 discloses a method and a related system for accelerating a booting process for a computing system. The method is adapted to an electronic device having a processor, an embedded controller, and a system memory in which program codes of a basic input/output system (BIOS) and the embedded controller of the electronic apparatus are commonly stored in the system memory. In the disclosed method, when receiving a booting triggering signal of the electronic apparatus, the processor controls the embedded controller to cease accessing the system memory, so as to load the BIOS program code for the system memory to a cache memory power-on self-test procedure.

Document EP 3518100 A1 discloses a method for fast loading a kernel image file to be executed by a multi-core processor. The multi-core processor is connected to a non-volatile storage and a memory. The method differentiates between different core groups of the multi-core processor, and the method comprises loading of data blocks into the memory depending on characteristics of the core groups.

However, a disadvantage of known solutions is that they manage resources in a more or less static form. Therefore, there may be a need to overcome these limitations and manage available resources of the computing system in a more flexible and dynamic way, in particular for startup and shutdown procedures.

SUMMARY

Embodiments of the present disclosure include a method, computer program product, and system for accelerating a start procedure of a computer system may be provided.

In some embodiments, the computer system may initialize one or more workloads. The computer system may operate in a boost mode and a regular mode. The boost mode may include an adjustment of a pacing setting and an adjustment of group availability targets for executing the one or more workloads. The computer system may identify that the boost mode is enabled during a system start of the computer system. The computer system may identify that the pacing setting is operating in the regular mode. The compute system may increase, dynamically, the pacing setting. The increase of the pacing setting may enable an increased processor utilization of the computer system by the one or more workloads. The increased processor utilization may generate a concurrent processing of the one or more workloads. The computer system may determine an end of the boost mode. The determining of the end of the boost mode may include re-setting the pacing setting to the pacing setting in the regular mode.

In some embodiments, the computer system may identify that a core system of the computer system has been initialized. The computer system may dynamically increase a number of active members of a group of software components. The number of active members of the group may be executed in parallel and enable the increased processor utilization by the one or more workloads.

In some embodiments, when a trigger signal for the end of the boost mode is set to a rule-based point in time after the core system has been initialized, the number of active members of the group may reset to a related regular grouping mode.

In some embodiments, when the increased processor utilization of the computer system includes the user of one or more processors, each of the one or more processors includes a plurality of partial processors.

In some embodiments, increasing the pacing setting may include increasing a number of parallel executing processor resources.

In some embodiments, the start procedure may be executed after a received fail-over signal.

In some embodiments, the start procedure may be hardware triggered.

In some embodiments, the computer system may auto-optimize a time requirement for the start procedure by applying a gradient descent algorithm. The gradient descent algorithm may be derived by changing the pacing setting and a grouping setting for individual start procedures. The computer system may select, as a setting for the pacing setting and as a setting for the grouping setting, values for which a function, T, that is a function of the pacing setting and the grouping setting, has an extremum and its first derivative is zero.

It is noted that the above-recited summary of the claims provides the advantages of managing available resources of the computing system in a more flexible and dynamic way, in particular for startup and shutdown procedures, as compared to traditional ways of managing computing resources during such procedures.

The above summary is not intended to describe each illustrated embodiment or every implementation of the present disclosure.

BRIEF DESCRIPTION OF THE DRAWINGS

It should be noted that embodiments of the disclosure are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above, and further aspects of the present disclosure, are apparent from the examples of embodiments to be described hereinafter and are explained with reference to the examples of embodiments, but to which the disclosure is not limited.

Figure 1:

Preferred embodiments of the disclosure will be described, by way of example only, and with reference to the following drawings:

FIG. 1 shows a block diagram of an embodiment of the inventive computer-implemented method for accelerating a start procedure of a computer system, in accordance with embodiments of the present disclosure.

Figure 2:
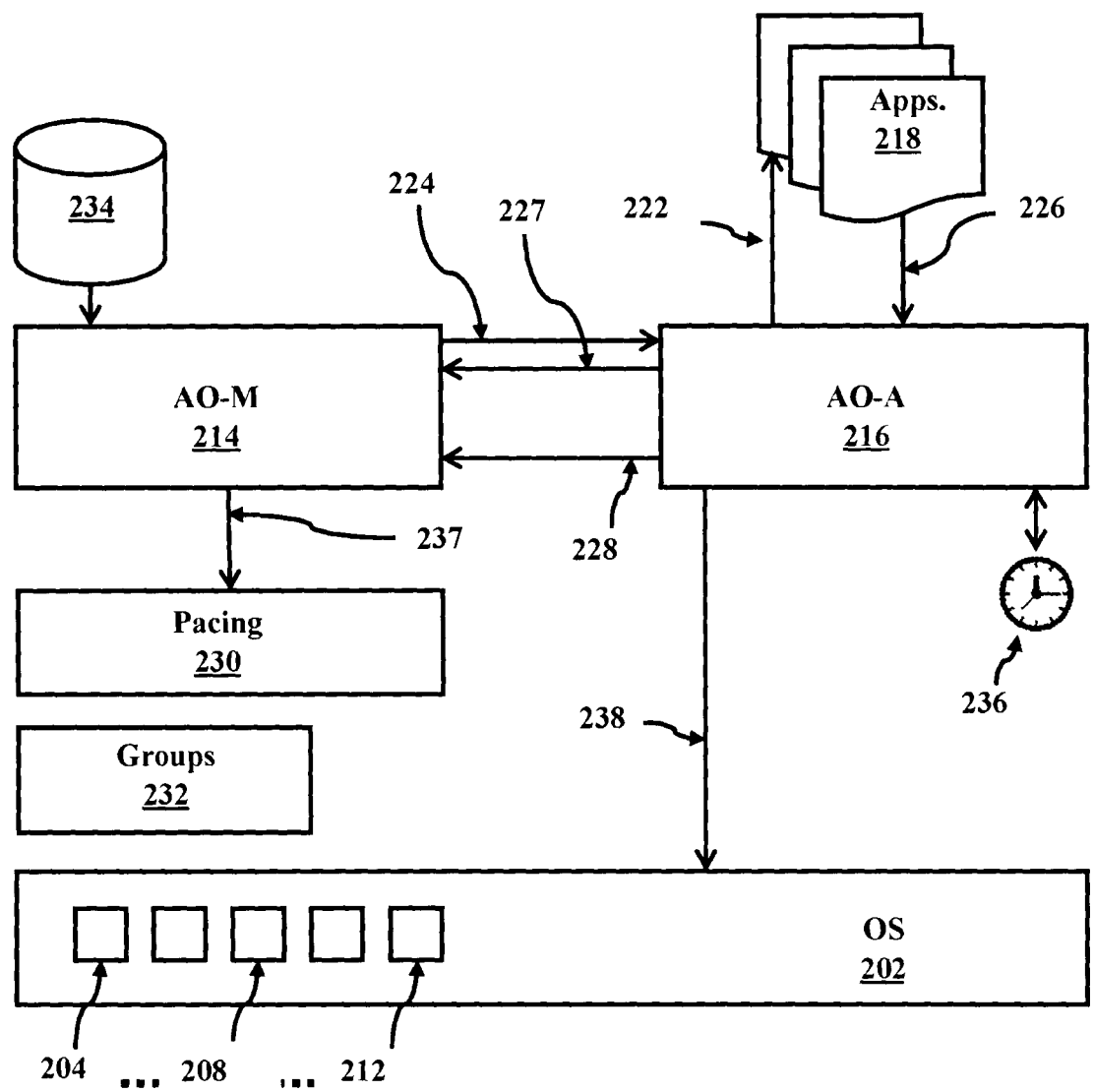

FIG. 2 shows a block diagram of an embodiment of components instrumental for the proposed concept, in accordance with embodiments of the present disclosure.

Figure 3:
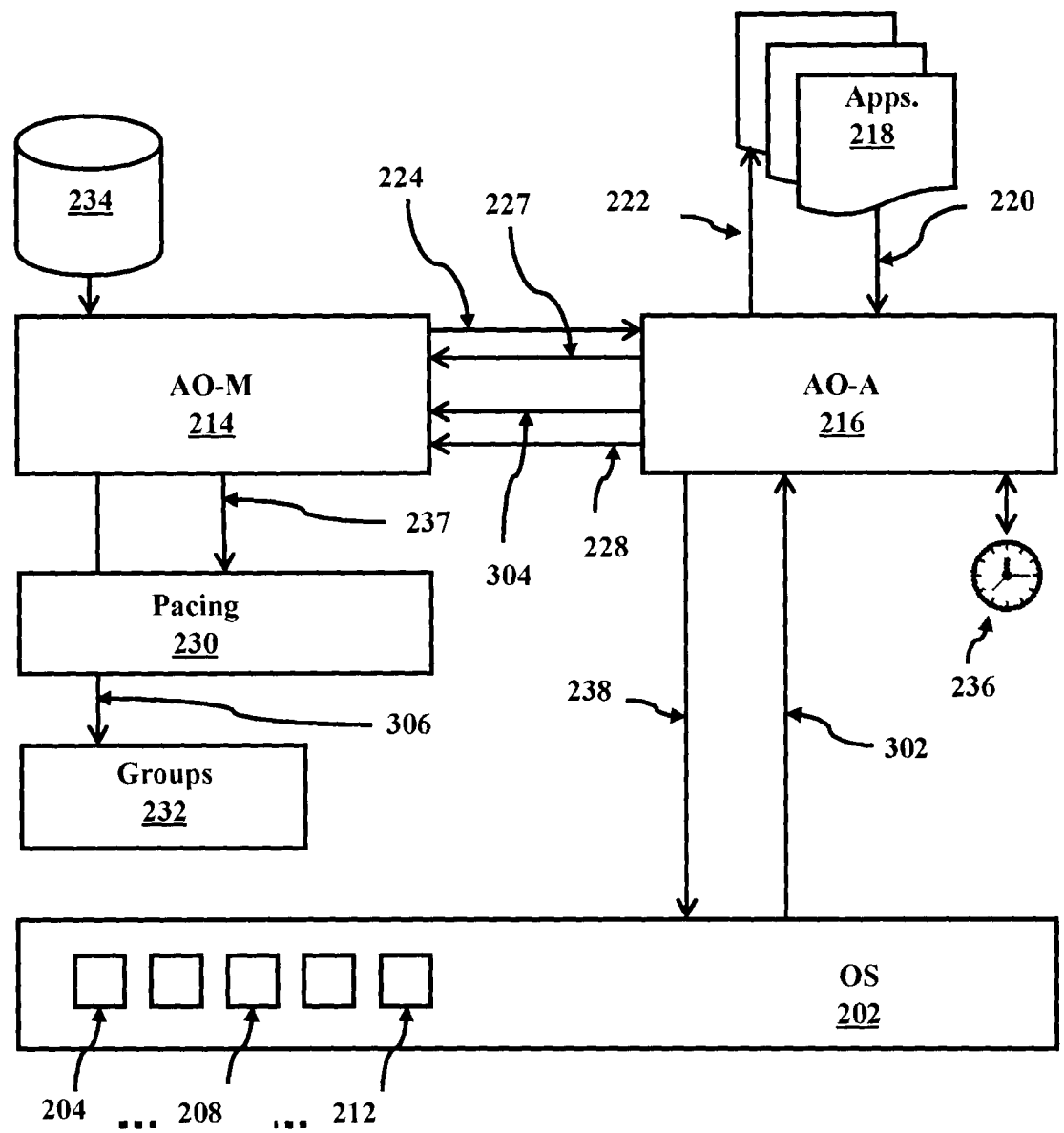

FIG. 3 shows a block diagram of a phase of an embodiment of the proposed method according to the embodiment of FIG. 2, in accordance with embodiments of the present disclosure.

Figure 4:
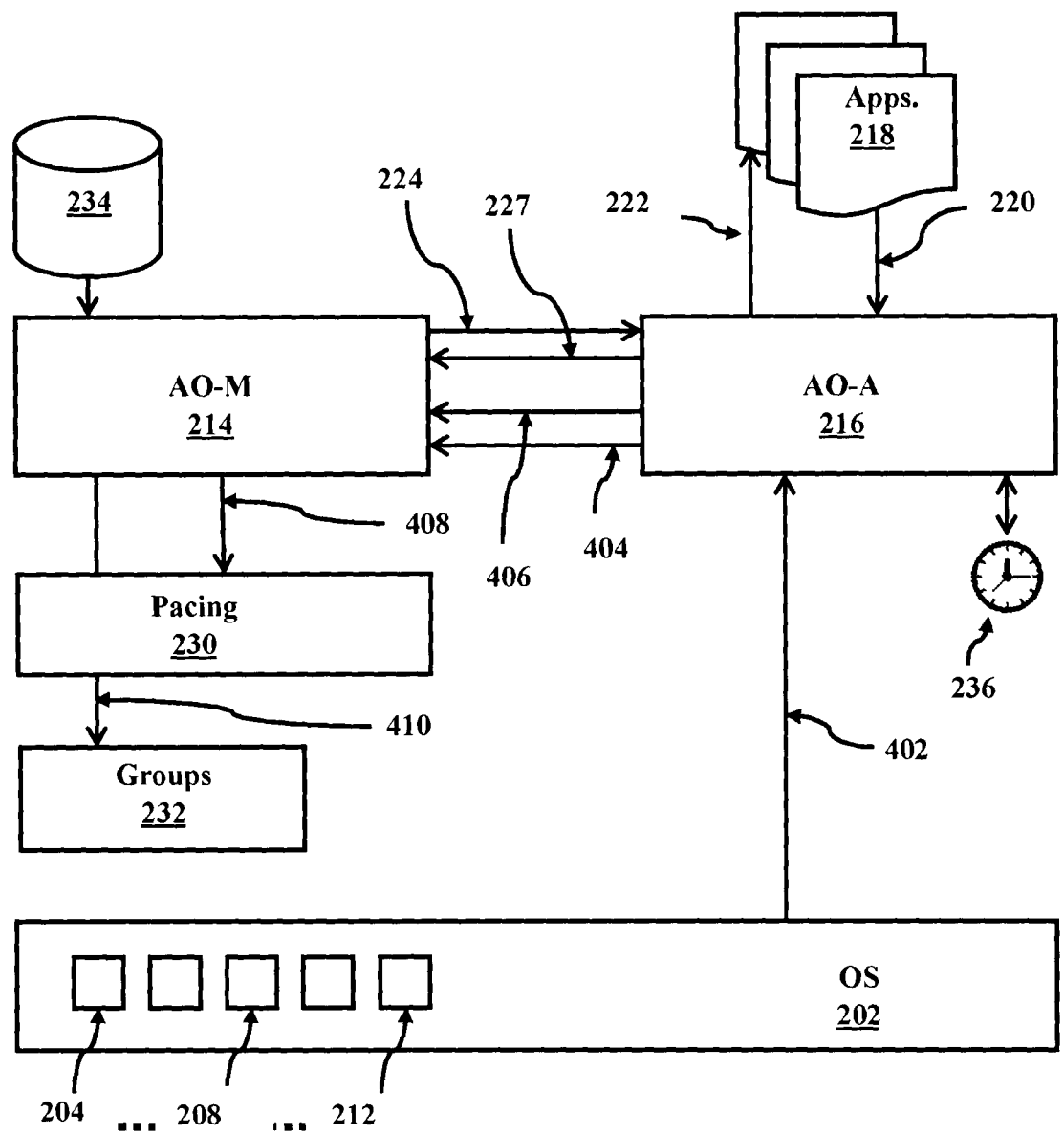

FIG. 4 shows a block diagram of a next phase of an embodiment of the proposed method, in accordance with embodiments of the present disclosure.

Figure 5:
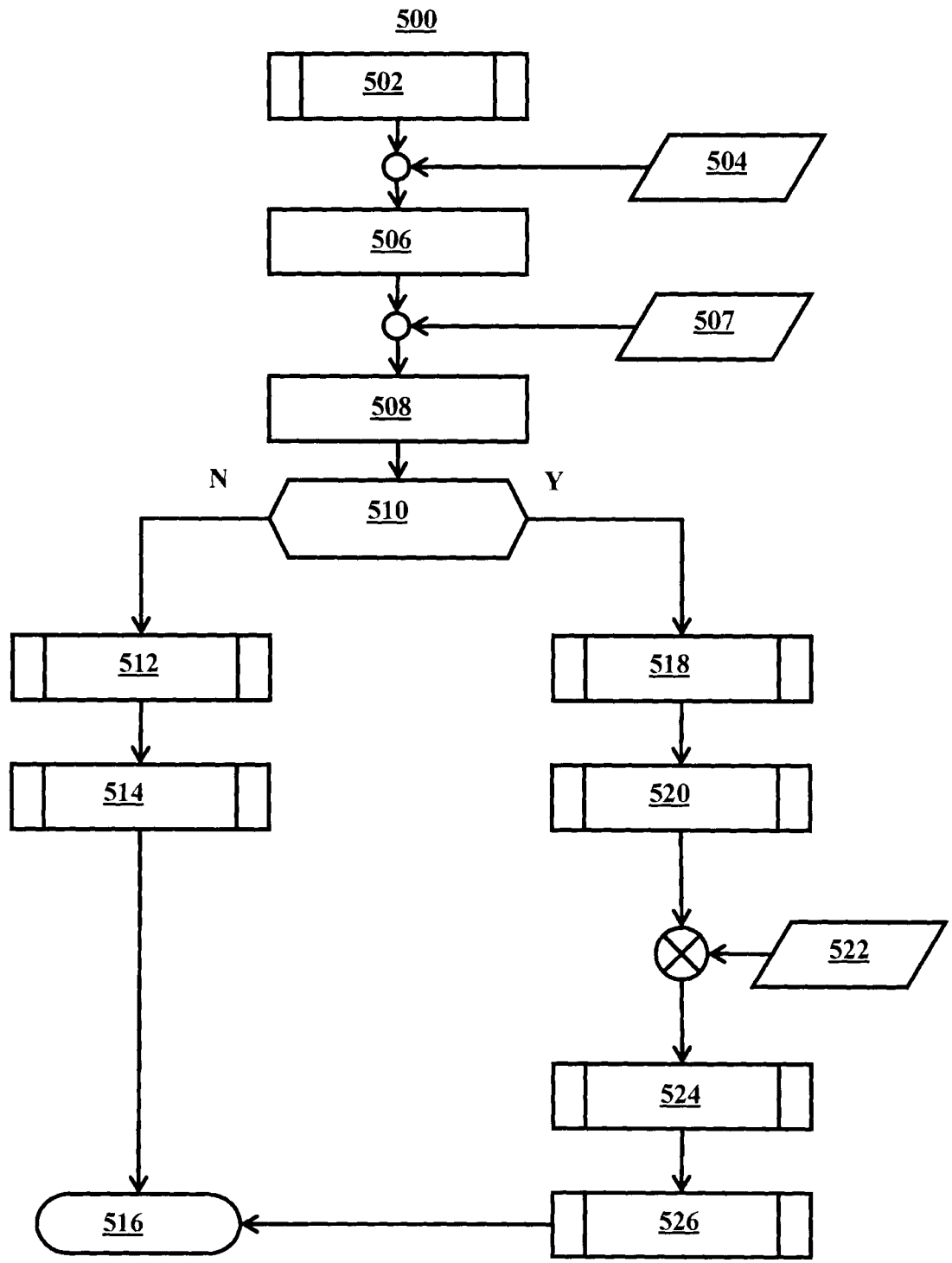

FIG. 5 shows a more implementation-near flow chart (flow A) of an embodiment of the proposed method, in accordance with embodiments of the present disclosure.

Figure 6:
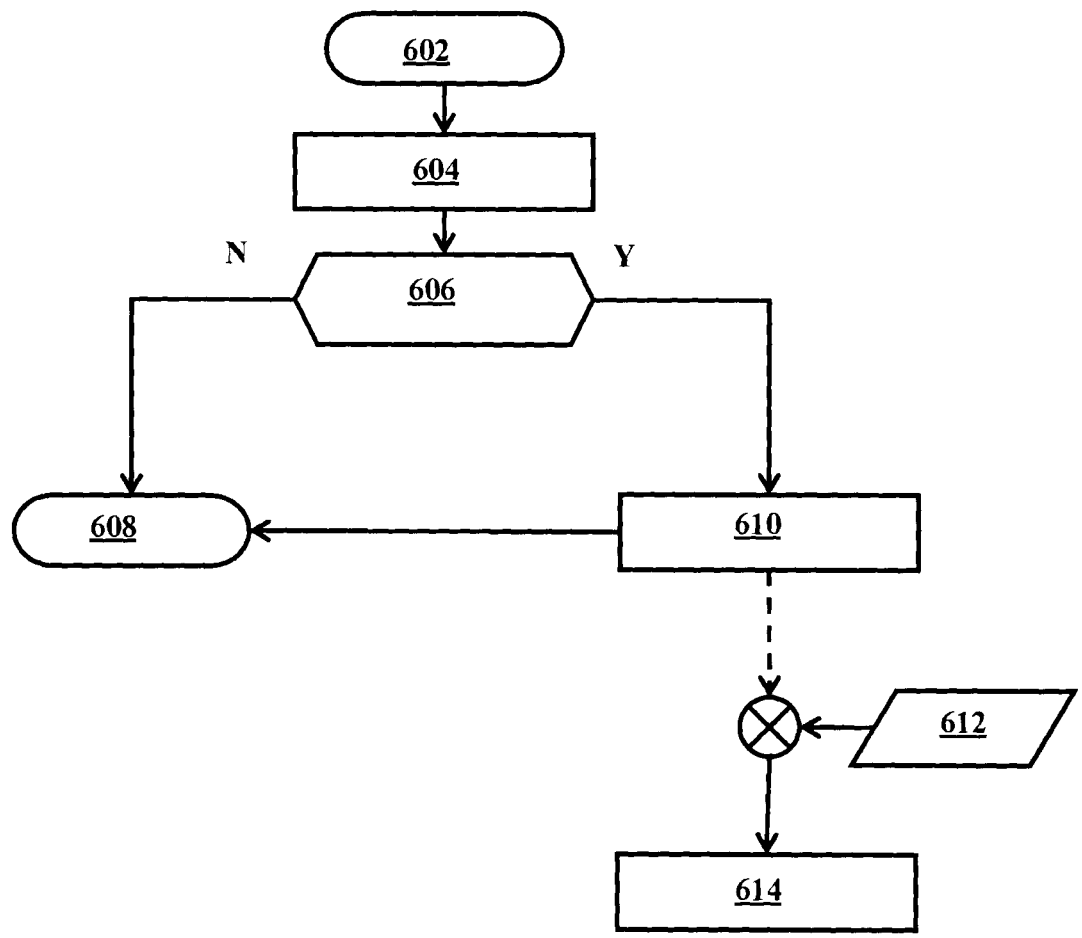

FIG. 6 shows a flowchart (flow B) of how to handle pacing, in accordance with embodiments of the present disclosure.

Figure 7:
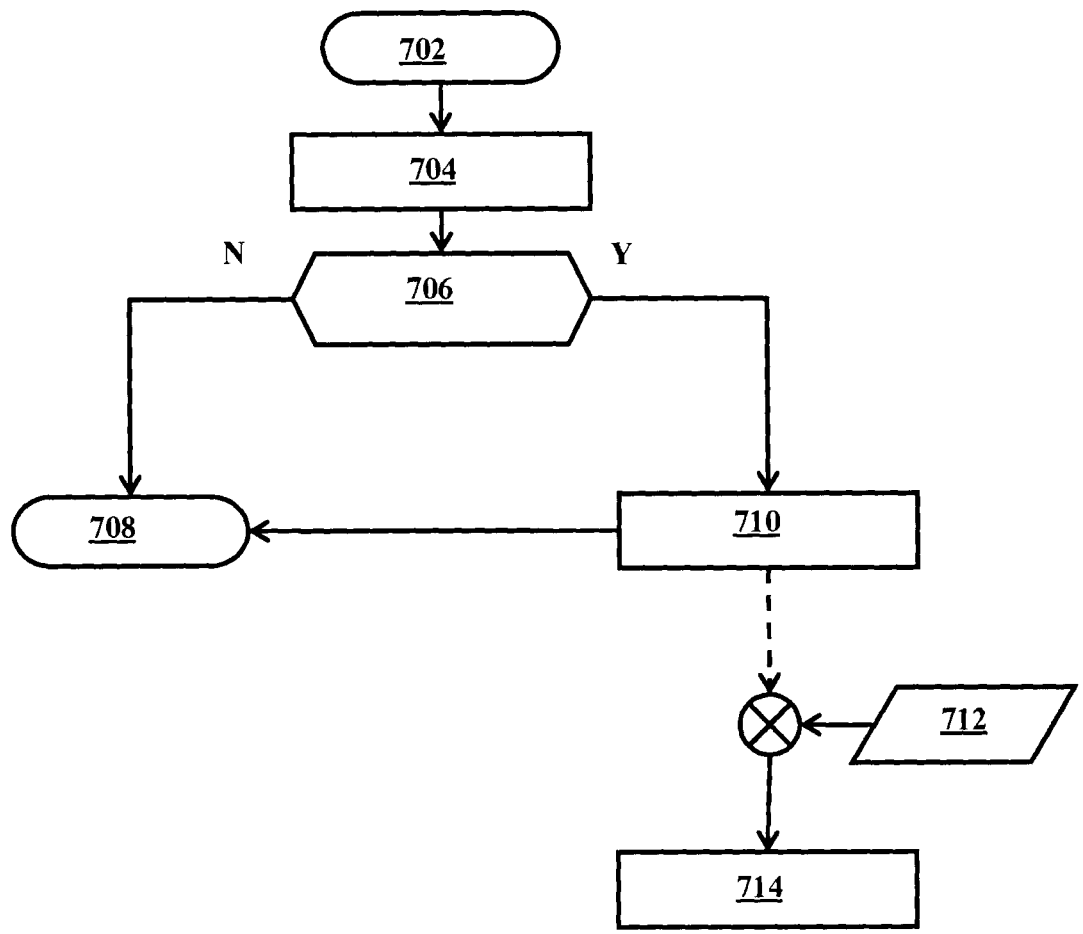

FIG. 7 shows a flowchart (flow C) of how to handle grouping, in accordance with embodiments of the present disclosure.

Figure 8:
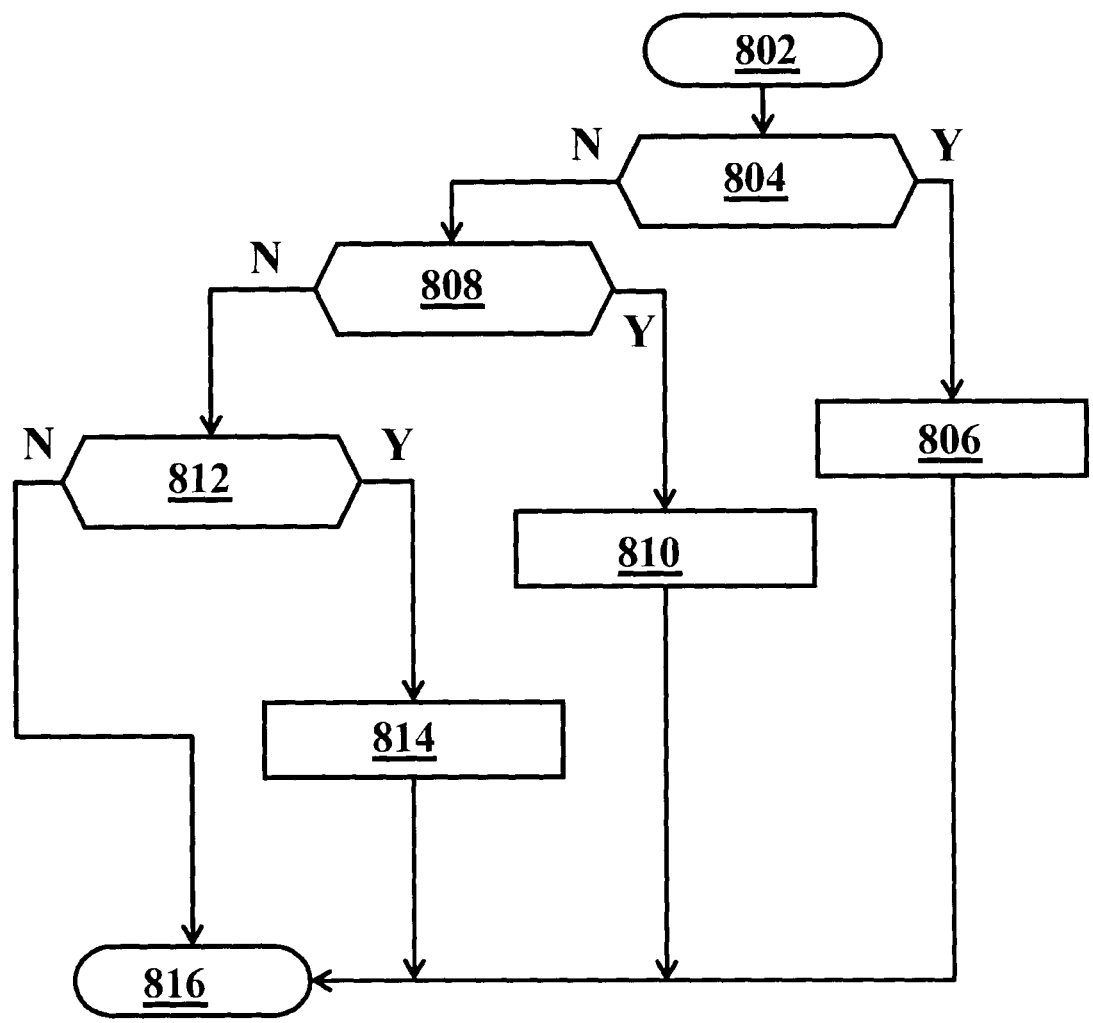

FIG. 8 shows a flowchart of how the pacing and/or group options are evaluated, in accordance with embodiments of the present disclosure.

Figure 9A:
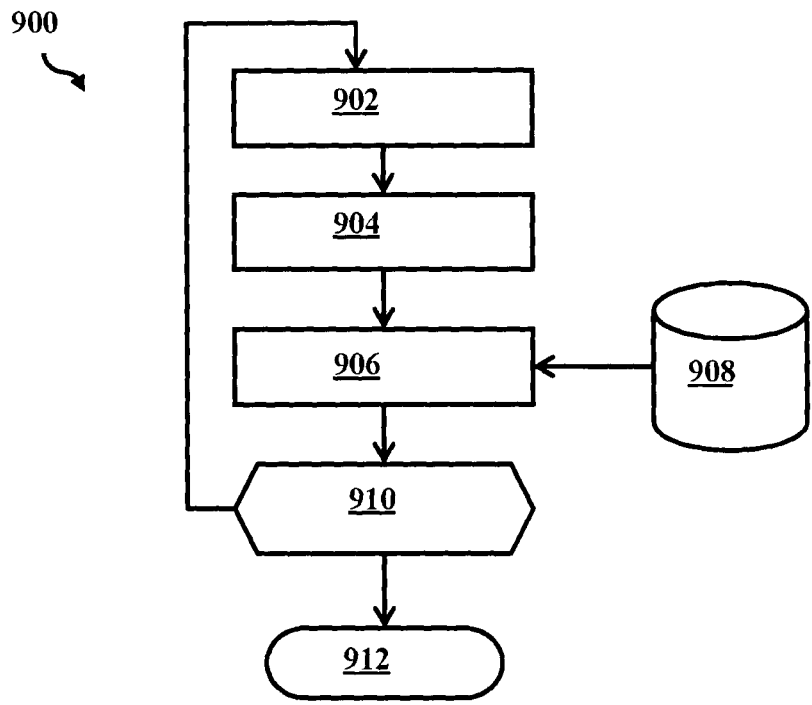

FIG. 9A shows a flowchart illustrating the IPL time depending on the pacing, in accordance with embodiments of the present disclosure.

Figure 9B:
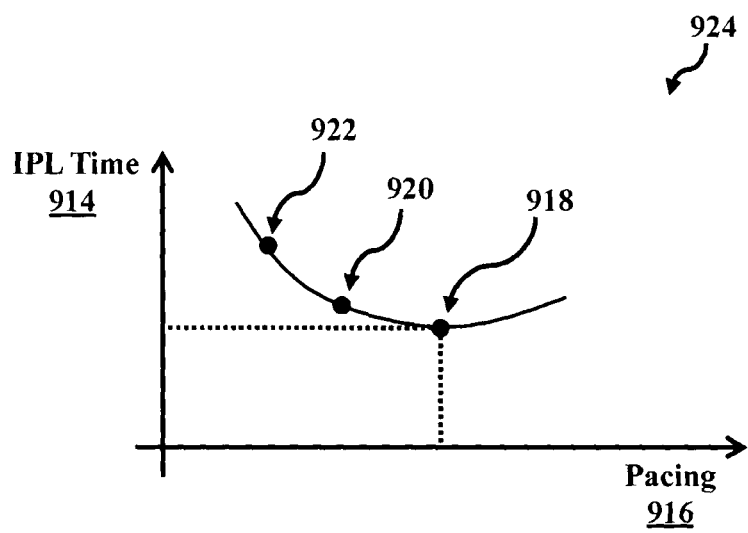

FIG. 9B shows a chart illustrating the IPL time depending on the pacing, in accordance with embodiments of the present disclosure.

Figure 10:
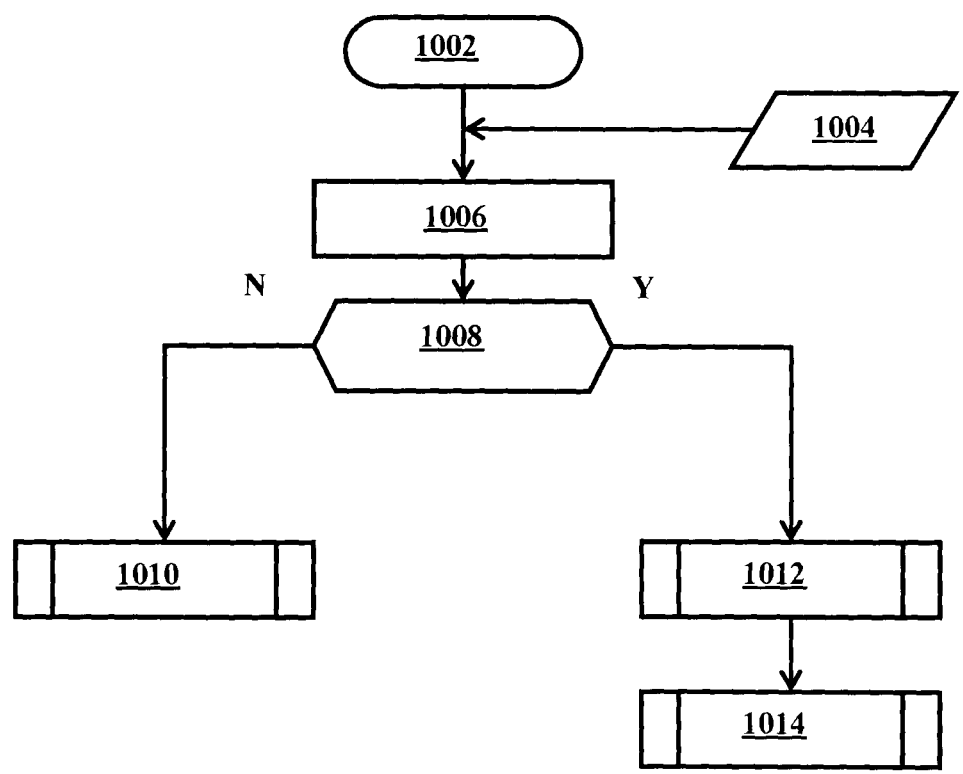

FIG. 10 shows a flowchart (flow D) of a system shutdown initiated by an operator, e.g., software initiated, in accordance with embodiments of the present disclosure.

Figure 11:
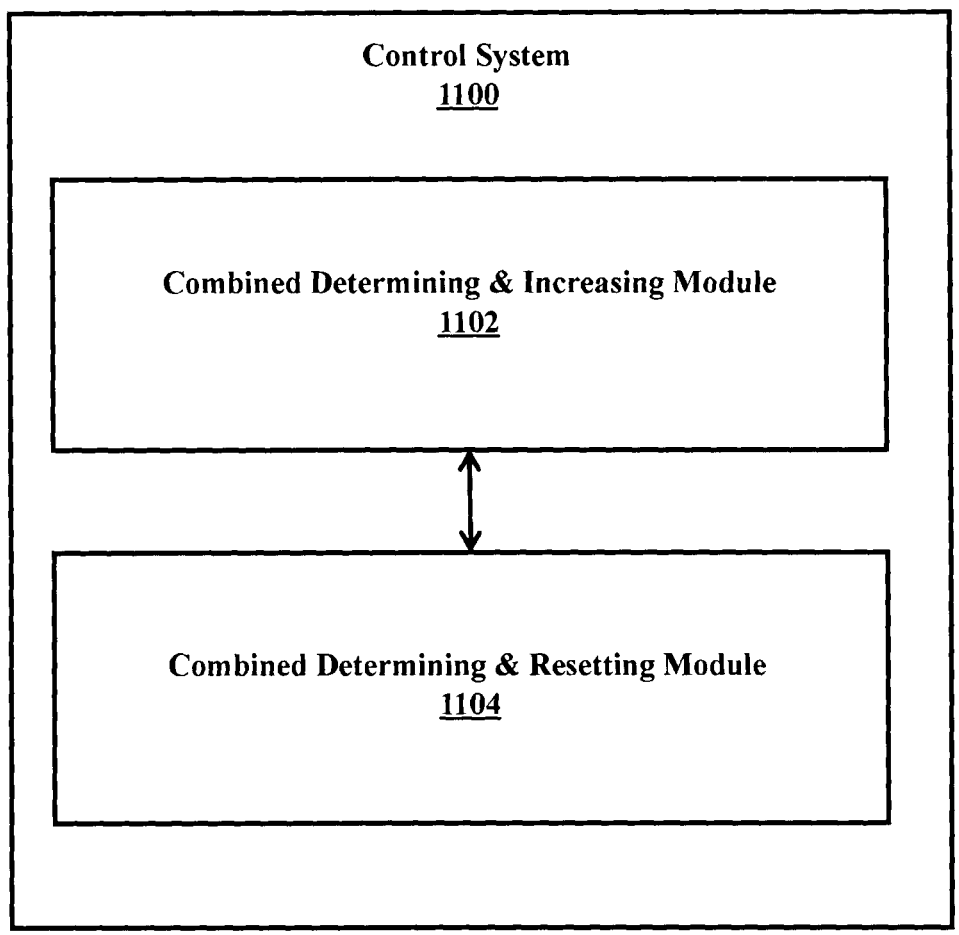

FIG. 11 shows a block diagram of the inventive control system for accelerating a start procedure of a computer system, in accordance with embodiments of the present disclosure.

Figure 12:
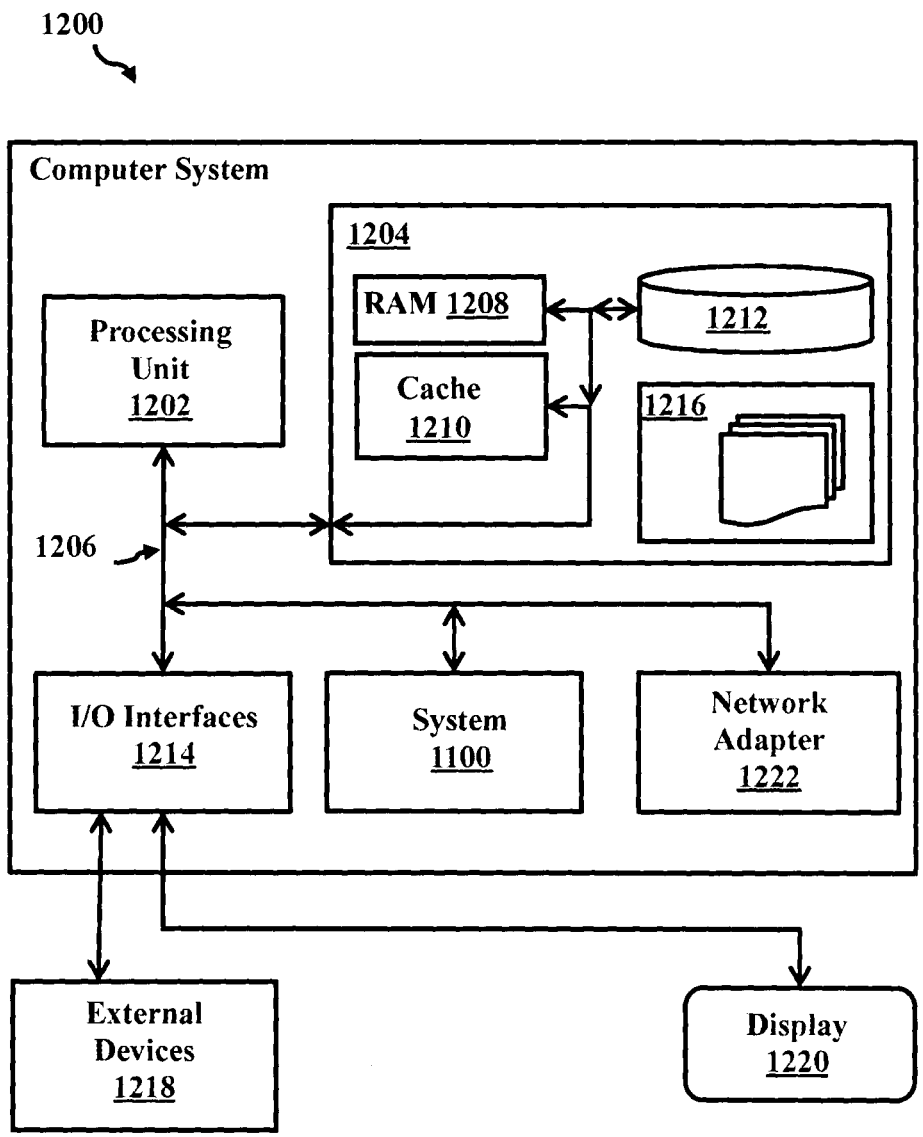

FIG. 12 shows a block diagram of a computing system with the control system according to FIG. 11, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

In the context of this description, the following conventions, terms and/or expressions may be used:

The term 'start procedure' may denote steps required in order to initialize a computing system, including booting of core elements, loading drivers, a base operating system, defining partitions of a complex computing system, starting a high level operating system, and similar tasks. After the start procedure ends, the computing system shall be able to execute applications, e.g., accept workloads. It may also be noted that the terms 'computer system' and 'computing system' may be used as synonyms.

The term 'workload' may basically denote any form of program code executed on the computer system using the CPU, memory, network capacity and other resources of the computer system. Different programs may require different resources, thus generating different workloads. Program code may be related to an operating system (e.g., system program code) or an application program (user or application program code).

The term 'boost mode' may denote a mode of the computing system in which more resources may be made dispatchable—and thus be actively available—for a limited amount of time. During normal operation, these additional resources are not available for dispatching certain application workload. Thus, the computing system may operate during times outside the activated boost mode using fewer resources than physically available, accessible and dispatchable during the boost mode.

The term 'processor utilization' may denote a percentage of time the processor may actively be used in a time slice. In case of a complex processor, the processor utilization may also denote an amount of processor resources used for a predefined time slice.

The term 'core system' may denote those components required to start working with the computing system, e.g., to start applications (e.g., workloads) on an initialized operating system on top of making subsystems—like, e.g., network components, discs systems, etc.—available.

The term 'partial processor' may denote—in case of a multicore processor—e.g., one of the cores of the multicore processor. Additionally, in case of more complex execution units, additional resources of the processor may be included in the partial processor, like, e.g., dedicated cache memory of a computing core or a dedicated extended command set (e.g., in form of dedicated micro-code).

In particular, in case of a so-called mainframe computer the term "partial processor" may require a specific definition. A Complex Execution Complex (CEC) may comprise a plurality of General Purpose Processors (GPP) and optionally another plurality of Integrated Information Processors (zIIP). The CEC may be logically separated into a plurality of logical partitions which each may represent a complete compute system. However, e.g., I/O channels may be used together. Additionally, a logical partition (LPAR) may share a processor with another LPAR (e.g., shared processors). On the other side it may be possible to dedicate a processor to an LPAR in order to guarantee a specified processor capacity.

Furthermore, it should be considered that within an LPAR an operating system (or control program, CP) only deals with logical processors which may physically be shared or dedicated processors. In the regular computing mode, an LPAR may comprise n-logical processors and m-integrated information processors which may execute workloads. It may also be noted that under normal conditions the zIIPs get only those workload dispatched for which they are optimized (e.g., Java programs or programs for dedicated operating system features).

Such more complex processors may be run in a sub-capacity mode in which the CPs are only time-wise partially dispatchable. If, e.g., the sub-capacity is defined to be 70%, then the CP is only for 70% of the time dispatchable and for 30% non-dispatchable. However, from a software point of view the LPAR continues to have n logical processors which seem to operate with less performance.

In contrast to this, in the boost mode of the CEC all n+m processors can be used (e.g., be dispatched) for workloads. This is where the above-formulated "increased processor utilization" may originate. All n general purpose processors may now be 100% dispatchable and the zIIPs may be available additionally (if installed).

The term 'gradient descent algorithm' may denote a first-order iterative optimization algorithm for finding the local minimum of a function. To find a local minimum of a function using gradient descent, one takes steps proportional to the negative of the gradient (or approximate gradient) of the function at the current point. Gradient descent was originally proposed by Cauchy in 1847.

The term 'shutdown procedure' may denote a process to finally power-off a computer from a computer's main components in a controlled way. After the computer system is shut down, main components such as CPUs, memory modules and/or hard disk drives are powered down, although some internal components, such as an internal clock or a watchdog or service processor, may retain power. In more complex computing systems, a shutdown procedure may relate also to a virtual machine or the main operating system for a portion of the complex computing system. As a consequence, a basic, low level operating system may still be active.

The term 'shutting down'—in particular shutting down a computing system—may denote to follow a predetermined shutdown procedure.

The term 'pacing gate' may denote means for configuring a degree of parallelism of processing during workload startup and/or shutdown. Originally, the pacing gate has been introduced in order to prevent that too many activities on the computing system are started or stopped at the same time which may lead to an overload of the computing system. If more capacity may become available, the concept is designed for opening the pacing gate to allow more parallelism. In the context of modern multicore CPUs, increasing the pacing may denote to make more of the course of the CPU available for parallel execution which, however, is not available under regular operations. This may mean that a user or owner of the computer may be able to activate these additional capacities.

The term 'group availability target' may denote the degree of parallelism of processing among the members of a group, in particular of a group of applications. The availability target may determine the number of members in a group of many members that should be available (e.g., active or up-and-running) at the same time and hence run in parallel. This should not be intermixed with "pacing", which may affect how many workloads may be started or stopped in parallel. They can then make use of available hardware resources. In contrast, the term "grouping" is directed to software which may be executed in parallel or not. As an illustrative example, the following may be considered: Pacing combined with groups means: while the group has an availability target of e.g., 10 and start pacing may is set to e.g., 2 that only 2 members can be started at a time up to until all 10 members are active. Without pacing, 10 members would be started at the same time, which can lead to an overload situation.

But generally, the two concepts are independent from each other and do not have to be combined.

In the following, a detailed description of the figures will be given. All instructions in the figures are schematic. Firstly, a block diagram of an embodiment of the inventive computer-implemented method for accelerating a start procedure of a computer system and for accelerating a shutdown procedure of a computer system is given. Afterwards, further embodiments, as well as embodiments of the control system for accelerating a start procedure of a computer system and a shutdown of a computer system, will be described.

FIG. 1 shows a block diagram of a preferred embodiment of the computer-implemented method 100 for accelerating a start procedure of a computer system. The start procedure comprises initializing of workloads, in particular, starting to execute software programs. The computer system should be operable in a boost mode and in a regular mode. The boost mode comprises an adjusting—typically increasing—of a pacing gate and group availability targets for executing workloads on a central execution complex—also known as a processor—or on logical partitions (LPAR) of the central execution complex of the computing system. The method comprises: upon determining that a boost mode is enabled during a system start of the computer system and upon determining that the pacing is operated in a regular mode, dynamically increasing, 102, the pacing setting for enabling an increased processor utilization of the computer system by the workloads, thereby starting more concurrent workloads compared with an operation of the processor in the regular mode, e.g., thereby finishing the start procedure earlier or faster.

The method 100 comprises additionally: re-setting, 104, the pacing setting to the regular mode if an end of the boost mode is determined. Thus, everything is reset to the normal operation mode so as if the proposed boosted resources may not have been used for the start procedure.

In case an equivalent method is applied for the shutdown procedure of a computer system, the re-setting step to the regular mode may be optionally because the computer system is shut down any way and a re-setting is not necessarily required.

FIG. 2 shows a block diagram 200 of an embodiment of components instrumental for the proposed concept and some new functionality of already known components. The underlying (hardware) system may be equipped with the operating system 202 having access to computing resources, e.g., in the form of the partial processors 204, . . . , 212. The automated operations (AO) manager (AO-M) 214 or AO controller may control, 237, the pacing settings 230 and/or the grouping setting 232 guided by dedicated policies in an AO database 234.

The AO agent 216 (AO-A) which may be ordered, 224, to start one or more application programs 218 (executing the order, 222) and monitor operations, 226, of the one or more application programs 218. The agent 216 is also enabled to report a status (227) back to the automated operations manager 214. A dedicated timer 236 is enabled to monitor whether the start procedure has been completed.

Taking also the newly proposed concept into consideration, the AO agent 216 may pass, 238, a query boost request 238 (step 1) to the operating system 202. The pacing option settings may be set (step 2) by the AO agent 216 (228) and the automated operations manager 214 sets or adjusts, 237, the pacing (step 3), e.g., the usage of more processing capacity (e.g., partial processors). Next steps of the method are discussed in the context of FIG. 3.

FIG. 3 shows a block diagram 300 of a next phase of an embodiment of the proposed method 100 according to the embodiment 200 of FIG. 2. The operating system 202 signals, 302, an "IPL complete notification" (step 4)—e.g., a respective message—to the AO agent 216 (AO-A). In turn, the AO agent 216 demands a specific grouping setting (304; step 5) from the automated operations controller 214. As a reaction to this, the automated operations manager 214 adjusts, 306 (step 6)—e.g., typically increases—the pacing settings, as well as, the group size (e.g., increases the grouping parallelism, e.g., the number of groups of allowed active members in a group).

Using this setup, the start procedure of the computing system may undergo an accelerated start (or start procedure) because more computing resources may be used which otherwise—e.g., under normal operational conditions—may not be accessible.

FIG. 4 shows a block diagram 400 of a next phase of an embodiment of the proposed method 100 according to embodiment 200 of FIG. 2. The operating system 202 may send, 402, a boost end notification message to the AO agent 216 (step 7) which again adjusts the required group setting options 404 (step 8) and pacing setting options 406 (step 9).

In turn, the AO controller reverts, 408, the pacing settings (step 10), and reverts, 410, the group availability target (step 11) to a normal operation mode.

FIG. 5 shows a more implementation-near flow chart 500 (flow A) of an embodiment of the proposed method. An LPAR (logical partition) activation, 502, comprises that the computing system is enabled to perform a boot process (e.g., an IPL) for the operating system, e.g., z/OS, 506. Whether or not a hardware triggered boosting 504 is active it can be indicated explicitly by a configurable option or inquired from the operating system, 507. In any case, the AO-controller is started, 508.

A regular system start and an extended system start are pre-defined processes orchestrated by the AO-controller. The extended start phase begins at the time, the IPL complete notification is available (see above). Thus, it is determined, 510, whether the boosting is active. If that is not the case,—case "N"—the regular 512 and the extended system start 514 is performed. As a consequence, the normal system IPL ends, 516.

If, on the other side, the boosting is active—case "Y"—the pacing is handled, 518 (compare flow B in FIG. 6) and the regular system start is performed, 520. After the IPL complete notification 522 has been received, the dynamic grouping is handled, 524 (compare flow C in FIG. 7) and the extended system start is performed, 526. At its end, the system IPL ends also in this branch of the flowchart, 516.

FIG. 6 shows a flowchart (flow B) 600 of how to handle pacing. The flow starts at 602. If pacing is enabled (exploited in a customer database) and specified to be dynamic (as specified for selected or all pacing constructs), the settings are adjusted accordingly: firstly, the pacing options are evaluated, 604. Then, it is determined, 606, whether the pacing needs to be changed. If that is not the case—case "N"—the handling of the pacing settings ends, 608. In case "Y" (yes), the pacing settings are adjusted 610—typically, increased—until a boost end notification is received, 612, after which the pacing settings are reverted to its original setting, 614.

Hence, the direct flow (normal start procedure) is finished at 608, but later on, when the boost period ends, the pacing setting will be reverted asynchronously to where they were before. The boost period end notification can be received in form of a signal from the operating system or it may be self-generated by the AO controller. It may also be noted that the boost options may differ from start(-up) to shutdown procedures.

FIG. 7 shows a flowchart (flow C) 700 of how to handle grouping. The flow starts at 702. If grouping is enabled (as exploited in a customer specific AO database) and specified to be dynamic (as specified for selected or all groups) the grouping settings are adjusted accordingly.

The group options are evaluated, 704, and then, it is determined, 706, whether the group size needs to be adjusted, typically increased. If that is not the case—case "N"—the handling of the dynamic grouping ends, 708. If in the determination 706 it is determined that the grouping size has to be changed—case "Y"—the group settings are adjusted, 710. After a boost period end notification 712 has been received, the group settings are reverted 714.

Normally, the direct flow of flow C ends at 708 after the adjustment of the group settings. But later on, when the boost period has ended, the group settings will be reverted asynchronously to where they were before. Also here, the boost period end notification can be in form of a signal from the operating system or it may be self-generated by the AO controller.

FIG. 8 shows a flowchart 800 of how the pacing and/or group options can be evaluated. The process starts at 802. A cascaded decision tree is executed. It starts with a determination 804 whether a specific pacing option "P" exists. If that is the case—case "Y"—the procedure "P" 806 is executed and the flow ends at 816. If the determination 804 ends negatively—case "N"—it is determined, 808, whether a default option "D" exists. If that is the case—case "Y"—the procedure "D" 810 is executed and the flow ends again at 816.

If, as a third option—case "N" in determination 808—it is determined, 812, that a general default "G" exists, the procedure "G" 816 is applied. If this is not determined—case "N"—nothing happens. In both of the last two options, the procedure ends at 816.

Now, the different defaults shall be explained. The goal is to require only a minimal configuration while providing maximum flexibility.

The option variations are: ±n|N|±m|func|opt, whereby ±n=relative number, N=absolute number, ±m=multiplier, func=function of capacity, and opt=adaptive optimization function.

It may be noted that it should be distinguished between start and stop options for pacing by specific tuples. The start options may only be used for the group settings.

Some examples may be given for the different options: general default: G=(1.2; 1.2) may mean that any pacing/grouping settings should be increased by 20%; pacing default: D=(+3; +2) may mean an increase by 3 for a start of the computing system and by 2 for a stop of the computing system; and specific pacing: P=(1.4; +2) may mean a multiplier of 1.4 for a start and an increase by 2 for a stop procedure.

Referring now to FIGS. 9A and 9B, which respectively illustrate a flowchart 900 and a chart 924 showing the IPL time 914 depending on the pacing 916. Instead of defining options, an adaptive, self-regulating mechanism may also be provided. A control loop A1 may be applied by "plotting" the IPL time 914 over the pacing 916. Then, a second control loop is applied by "plotting" the throughput of the computing system over the group size. Then, the mechanism works as follows: applying one or several small changes using the gradient descent approach to minimize the IPL time T, measuring the outcome (e.g., the IPL time), collect the new data point (922, 920, 918) as a set of attributes T=F(a1, a2, . . . , an). The local minimum 918 settings are found if the absolute value of the derivative f of F is smaller than a predefined threshold (f~0).

The corresponding flowchart 900 starts with trying out, 902, a data change of any kind (pacing or grouping). Results are measured, 904, and new changes are applied again, 906, the supplied new data may also be loaded from a database of historic data 908. Then, it is determined whether a local minimum is found, 910. If that is not the case—case "N"—the process loops back to the beginning. Otherwise—case "Y"—the optimum and is found, and the procedure ends, 912.

FIG. 10 shows a flowchart (flow D) of a system shutdown initiated by an operator, e.g., software initiated. Here, only the pacing may be relevant because the grouping focuses on workloads which may have been stopped already anyway or are determined to be stopped as part of the system shutdown.

The flowchart starts with a shutdown command 1002. The AO-triggered boost setting 1004 is turned on by starting an operating system provided procedure (well known in the context of mainframe computing). The user may do this manually—or better—by including this procedure in his shutdown flow of the automation operation controller. Either way, this is treated as an AO-triggered boost.

Next, the shutdown begins, 1006. It is determined, 1008, whether boosting is active. If that is not the case—case "N"—the regular system shutdown procedure is executed, 1010. If the boost is active—case "Y"—the pacing is handled, 1012, according to flow B (compare FIG. 6) and the procedure ends with the regular system shutdown steps, so as no dynamic group adaptation would be active, 1014.

Whether or not boosting is active can be indicated explicitly by a configurable option or acquired from the operating system. Thereby, the regular system shutdown is a predefined process orchestrated by the AO controller.

FIG. 11 shows a block diagram of the inventive control system 1100 for accelerating a start procedure of a computer system. Also here, the start procedure comprises initializing of workloads, and the computer system is operable in a boost mode and in a regular mode. The boost mode comprises an adjusting of a pacing gate and group availability targets for executing workloads on a central execution complex of the computing system. The control system comprising a determining and increasing means—in particular a determination and increasing module 1102 adapted for: upon determining that a boost mode is enabled during a system start of the computer system and upon determining that the pacing is operated in a regular mode, dynamically increasing the pacing setting for enabling an increased processor utilization of the computer system by the workloads. Thereby, more workloads are started concurrently compared with an operation of the processor in the regular mode.

The control system 1100 also comprises determining and resetting means—in particular, a combined determining and resetting module 1104—adapted for: upon determining an end of the boost mode, re-setting the pacing setting to the regular mode. It should be made clear that the combined determining an increasing module 1102 and the combined determining and resetting module are interconnected and enabled to exchange control signals.

It may also be noted that the related control system for shutting down a computer system may be controlled completely with interconnected hardware modules.

Embodiments of the disclosure may be implemented together with virtually any type of computer, regardless of the platform being suitable for storing and/or executing program code. FIG. 12 shows, as an example, a computing system 1200 suitable for executing program code related to the proposed method.

The computing system 1200 is only one example of a suitable computer system, and is not intended to suggest any limitation as to the scope of use or functionality of embodiments of the disclosure described herein, regardless, whether the computer system 1200 is capable of being implemented and/or performing any of the functionality set forth hereinabove. In the computer system 1200, there are components, which are operational with numerous other general purpose or special purpose computing system environments or configurations. Examples of well-known computing systems, environments, and/or configurations that may be suitable for use with computer system/server 1200 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 1200 may be described in the general context of computer system-executable instructions, such as program modules, being executed by a computer system 1200. Generally, program modules may include routines, programs, objects, components, logic, data structures, and so on that perform particular tasks or implement particular abstract data types. Computer system/server 1200 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 1200 is shown in the form of a general-purpose computing device. The components of computer system/server 1200 may include, but are not limited to, one or more processors or processing units 1202, a system memory 1204, and a bus 1206 (or channel subsystem) that couple various system components including system memory 1204 to the processor 1202. Bus 1206 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 1200 typically includes a variety of computer system readable media. Such media may be any available media that is accessible by computer system/server 1200, and it includes both, volatile and non-volatile media, removable and non-removable media.

The system memory 1204 may include computer system readable media in the form of volatile memory, such as random access memory (RAM) 1208 and/or cache memory 1210. Computer system/server 1200 may further include other removable/non-removable, volatile/non-volatile computer system storage media. By way of example only, a storage system 1212 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 1206 by one or more data media interfaces. As will be further depicted and described below, memory 1204 may include at least one program product having a set (e.g., at least one) of program modules that are configured to carry out the functions of embodiments of the disclosure.

The program/utility, having a set (at least one) of program modules 1216, may be stored in memory 1204 by way of example, and not limiting, as well as an operating system, one or more application programs, other program modules, and program data. Each of the operating systems, one or more application programs, other program modules, and program data or some combination thereof, may include an implementation of a networking environment. Program modules 1216 generally carry out the functions and/or methodologies of embodiments of the disclosure, as described herein.

The computer system/server 1200 may also communicate with one or more external devices 1218 such as a keyboard, a pointing device, a display 1220, etc.; one or more devices that enable a user to interact with computer system/server 1200; and/or any devices (e.g., network card, modem, etc.) that enable computer system/server 1200 to communicate with one or more other computing devices. Such communication can occur via Input/Output (I/O) interfaces 1214. Still yet, computer system/server 1200 may communicate with one or more networks such as a local area network (LAN), a general wide area network (WAN), and/or a public network (e.g., the Internet) via network adapter 1222. As depicted, network adapter 1222 may communicate with the other components of the computer system/server 1200 via bus 1206. It should be understood that, although not shown, other hardware and/or software components could be used in conjunction with computer system/server 1200. Examples, include, but are not limited to: microcode, device drivers, redundant processing units, external disk drive arrays, RAID systems, tape drives, and data archival storage systems, etc.

Additionally, a control system 1100 for accelerating a start procedure of a computer system and a shutdown of a computer system may be attached to the bus system 1206.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present disclosure may be embodied as a system, a method, and/or a computer program product. The computer program product may include a computer readable storage medium (or media) having computer readable program instructions thereon for causing a processor to carry out aspects of the present disclosure.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the disclosure in the form disclosed. Many modifications and variations will be apparent to those of ordinary skills in the art without departing from the scope and spirit of the disclosure. The embodiments are chosen and described in order to best explain the principles of the disclosure and the practical application, and to enable others of ordinary skills in the art to understand the disclosure for various embodiments with various modifications, as are suited to the particular use contemplated.

In a nutshell, the proposed inventive concept may be summarized in the following clauses:

A computer-implemented method for accelerating a start procedure of a computer system, the start procedure comprising initializing of workloads, the computer system being operable in a boost mode and in a regular mode, wherein the boost mode comprises an adjusting of a pacing gate and group availability targets for executing workloads on a central execution complex of the computing system, the method comprising: upon determining that a boost mode is enabled during a system start of the computer system and upon determining that the pacing is operated in a regular mode, dynamically increasing the pacing setting for enabling an increased processor utilization of the computer system by the workloads, thereby starting more concurrent workloads compared with an operation of the processor in the regular mode, and upon determining an end of the boost mode, re-setting the pacing setting to the regular mode.

The method presented above, also comprising upon determining that a core system of the computer system has been initialized, dynamically increasing a number of active members of a group of software components being executable in parallel for enabling an increased processor utilization by the workloads.

The method presented above, wherein a trigger signal for an end of the boost mode is set to a rule-based point in time after the core system has been initialized, and wherein the number of active members of a group is reset to a related regular grouping mode.

The method according to any of the preceding instances above, wherein the processor comprises a plurality of partial processors.

The method presented above, wherein the increasing of the pacing setting comprises increasing a number of parallel executing processor resources.

The method according to any of any of the preceding instances above, wherein the start procedure is executed after a received fail-over signal.

The method presented above, also comprising auto-optimizing the time required for the start procedure by applying a gradient descent algorithm by changing the pacing setting and a grouping setting for individual start procedures, and selecting as setting for the pacing and as setting for the grouping values for which a function T, which is a function of a pacing setting and a grouping setting, has an extremum and its first derivative is sufficiently close to zero.

The method according to any of any of the preceding instances above, wherein the start procedure is hardware triggered.

A computer-implemented method for accelerating a shutdown procedure of a computer system, the shutdown procedure comprising shutting down of workloads, the computer system being operable in a boost mode and in a regular mode, wherein the boost mode comprises an adjusting of a pacing for a processor of the computing system, the method comprising: upon determining that a boost mode is enabled during a system shutdown of the computer system and upon determining that the pacing is operated in a regular mode, dynamically adjusting the pacing setting depending on a processor utilization of the computer system by the workloads, thereby stopping more concurrent workloads concurrently.

The method presented above, wherein the shutdown procedure is software triggered.

A control system for accelerating a start procedure of a computer system, the start procedure comprising initializing of workloads, the computer system being operable in a boost mode and in a regular mode, wherein the boost mode comprises an adjusting of a pacing gate and group availability targets for executing workloads on a central execution complex of the computing system, the control system comprising: a determining and increasing means adapted for: upon determining that a boost mode is enabled during a system start of the computer system and upon determining that the pacing is operated in a regular mode, dynamically increasing the pacing setting for enabling an increased processor utilization of the computer system by the workloads, thereby starting more concurrent workloads compared with an operation of the processor in the regular mode, and a determining and re-setting means adapted for: upon determining an end of the boost mode, re-setting the pacing setting to the regular mode.

The control system presented above, where the determining and increasing means are also adapted for upon determining that a core system of the computer system has been initialized, dynamically increasing a number of active members of a group of software components being executable in parallel for enabling an increased processor utilization by the workloads.

The control system presented above, also comprising trigger means adapted for setting a trigger signal to an end of the boost mode to a rule-based point in time after the core system has been initialized, and wherein the number of active members of a group are reset to a related regular grouping mode.

The control system presented above, wherein the processor comprises a plurality of partial processors.

The control system presented above, wherein the increasing of the pacing setting comprises increasing a number of parallel executing processor resources.

The control system present above, also comprising optimization means adapted for auto-optimizing the time required for the start procedure by applying a gradient descent algorithm by changing the pacing setting and a grouping setting for individual start procedures, and adapted for selecting as setting for the pacing and as setting for the grouping values for which a first derivative of a function T=function of, which is a function of a pacing setting and a grouping setting, has an extremum and its first derivative is sufficiently close to zero.

The control system according to any of any of the preceding instances above, wherein the start procedure is hardware triggered.

A control system for accelerating a shutdown procedure of a computer system, the shutdown procedure comprising shutting down of workloads, the computer system being operable in a boost mode and in a regular mode, wherein the boost mode comprises an adjusting of a pacing for a processor of the computing system, the control system comprising determining and adjusting means adapted for: upon determining that a boost mode is enabled during a system shutdown of the computer system and upon determining that the pacing is operated in a regular mode, dynamically adjusting the pacing setting depending on a processor utilization of the computer system by the workloads, thereby stopping more concurrent workloads concurrently.

A computer program product for accelerating a start procedure of a computer system, the start procedure comprising initializing of workloads, the computer system being operable in a boost mode and in a regular mode, wherein the boost mode comprises an adjusting of a pacing gate and group availability targets for executing workloads on a central execution complex of the computing system, the computer program product comprising a computer readable storage medium having program instructions embodied therewith, said program instructions being executable by one or more computing systems or controllers to cause said one or more computing systems to upon determining that a boost mode is enabled during a system start of the computer system and upon determining that the pacing is operated in a regular mode, dynamically increasing the pacing setting for enabling an increased processor utilization of the computer system by the workloads, thereby starting more concurrent workloads compared with an operation of the processor in the regular mode, and upon determining an end of the boost mode, re-setting the pacing setting to the regular mode.

Further condensed, in some embodiments, a method, computer program product, and system for accelerating a start procedure of a computer system is provided is the present disclosure.

In some embodiments, the computer system may initialize one or more workloads. The computer system may operate in a boost mode and a regular mode. The boost mode may include an adjustment of a pacing setting and an adjustment of group availability targets for executing the one or more workloads. The computer system may identify that the boost mode is enabled during a system start of the computer system. The computer system may identify that the pacing setting is operating in the regular mode. The compute system may increase, dynamically, the pacing setting. The increase of the pacing setting may enable an increased processor utilization of the computer system by the one or more workloads. The increased processor utilization may generate a concurrent processing of the one or more workloads. The computer system may determine an end of the boost mode. The determining of the end of the boost mode may include re-setting the pacing setting to the pacing setting in the regular mode.

In some embodiments, the computer system may identify that a core system of the computer system has been initialized. The computer system may dynamically increase a number of active members of a group of software components. The number of active members of the group may be executed in parallel and enable the increased processor utilization by the one or more workloads.

In some embodiments, when a trigger signal for the end of the boost mode is set to a rule-based point in time after the core system has been initialized, the number of active members of the group may reset to a related regular grouping mode.

In some embodiments, when the increased processor utilization of the computer system includes the user of one or more processors, each of the one or more processors includes a plurality of partial processors.

In some embodiments, increasing the pacing setting may include increasing a number of parallel executing processor resources.

In some embodiments, the start procedure may be executed after a received fail-over signal.

In some embodiments, the start procedure may be hardware triggered.

In some embodiments, the computer system may auto-optimize a time requirement for the start procedure by applying a gradient descent algorithm. The gradient descent algorithm may be derived by changing the pacing setting and a grouping setting for individual start procedures. The computer system may select, as a setting for the pacing setting and as a setting for the grouping setting, values for which a function, T, that is a function of the pacing setting and the grouping setting, has an extremum and its first derivative is zero.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer-implemented method, the method comprising:
    initializing, by the computer system, two or more workloads, wherein the computer system operates in a boost mode or a regular mode, wherein the boost mode includes an adjustment of a pacing setting and an adjustment of group availability targets for executing the two or more workloads;
    identifying that the boost mode is enabled during a system start procedure of the computer system, wherein the system start procedure is executed after a received fail-over signal, and wherein the system start procedure is hardware triggered;
    identifying that the pacing setting is operating in the regular mode;
    auto-optimizing a time requirement for the system start procedure by applying a gradient descent algorithm, wherein the gradient descent algorithm is derived by changing the pacing setting and a grouping setting for individual system start procedures;
    selecting, as a setting for the pacing setting and as a setting for the grouping setting, values for which a function T that is a function of the pacing setting and the grouping setting, has an extremum and its first derivative is zero;
    increasing, dynamically, the pacing setting, wherein increasing the pacing setting enables an increased processor utilization of the computer system by the two or more workloads, and wherein the increased processor utilization generates a concurrent processing of the two or more workloads; and
    determining an end of the boost mode, wherein determining the end of the boost mode includes re-setting the pacing setting to the pacing setting in the regular mode.

2. The method of claim 1, further comprising:
    identifying that a core system of the computer system has been initialized; and
    increasing, dynamically, a number of active members of a group of software components, wherein the number of active members of the group are executed in parallel and enable the increased processor utilization by the two or more workloads.

3. The method of claim 2, wherein a trigger signal for the end of the boost mode is set to a rule-based point in time after the core system has been initialized, and wherein the number of active members of the group is reset to a related regular grouping mode.

4. The method of claim 1, wherein the increased processor utilization of the computer system includes the use of one or more processors, and wherein each of the one or more processors includes a plurality of core processors.

5. The method of claim 4, wherein the increasing of the pacing setting includes increasing a number of parallel executing processors.

6. A control system for a computer system, the control system comprising:
    a memory; and
    a processor in communication with the memory, the processor executing instructions contained within the memory in order to perform operations comprising:
    initializing two or more workloads, wherein the computer system operates in a boost mode or a regular mode, wherein the boost mode includes an adjustment of a pacing setting and an adjustment of group availability targets for executing the two or more workloads;
    identifying that the boost mode is enabled during a system start procedure of the computer system, wherein the system start procedure is executed after a received fail-over signal, and wherein the system start procedure is hardware triggered;
    identifying that the pacing setting is operating in the regular mode;
    auto-optimizing a time requirement for the system start procedure by applying a gradient descent algorithm, wherein the gradient descent algorithm is derived by changing the pacing setting and a grouping setting for individual system start procedures;
    selecting, as a setting for the pacing setting and as a setting for the grouping setting, values for which a function T that is a function of the pacing setting and the grouping setting, has an extremum and its first derivative is zero;
    increasing, dynamically, the pacing setting, wherein increasing the pacing setting enables an increased processor utilization of the computer system by the two or more workloads, and wherein the increased processor utilization generates a concurrent processing of the two or more workloads; and
    determining an end of the boost mode, wherein determining the end of the boost mode includes re-setting the pacing setting to the pacing setting in the regular mode.

7. The control system of claim 6, wherein the operations further comprise:
    identifying that a core system of the computer system has been initialized; and
    increasing, dynamically, a number of active members of a group of software components, wherein the number of active members of the group are executed in parallel and enable the increased processor utilization by the two or more workloads.

8. The control system of claim 7, wherein a trigger signal for the end of the boost mode is set to a rule-based point in time after the core system has been initialized, and wherein the number of active members of the group is reset to a related regular grouping mode.

9. The control system of claim 6, wherein the increased processor utilization of the computer system includes the use of one or more processors, and wherein each of the one or more processors includes a plurality of core processors.

10. The control system of claim 9, wherein the increasing of the pacing setting includes increasing a number of parallel executing processors.

11. A computer program product, the computer program product comprising a computer readable storage medium having program instructions embodied therewith, the program instructions executable by a processor to cause the processor to perform a function, the function comprising:
  initializing two or more workloads, wherein the computer system operates in a boost mode or a regular mode, wherein the boost mode includes an adjustment of a pacing setting and an adjustment of group availability targets for executing the two or more workloads;
  identifying that the boost mode is enabled during a system start procedure of the computer system, wherein the system start procedure is executed after a received fail-over signal, and wherein the system start procedure is hardware triggered;
  identifying that the pacing setting is operating in the regular mode;
  auto-optimizing a time requirement for the system start procedure by applying a gradient descent algorithm, wherein the gradient descent algorithm is derived by changing the pacing setting and a grouping setting for individual system start procedures;
  selecting, as a setting for the pacing setting and as a setting for the grouping setting, values for which a function T that is a function of the pacing setting and the grouping setting, has an extremum and its first derivative is zero;
  increasing, dynamically, the pacing setting, wherein increasing the pacing setting enables an increased processor utilization of the computer system by the two or more workloads, and wherein the increased processor utilization generates a concurrent processing of the two or more workloads; and
  determining an end of the boost mode, wherein determining the end of the boost mode includes re-setting the pacing setting to the pacing setting in the regular mode.

12. The computer program product of claim 11, wherein the function further comprises:
  identifying that a core system of the computer system has been initialized; and
  increasing, dynamically, a number of active members of a group of software components, wherein the number of active members of the group are executed in parallel and enable the increased processor utilization by the two or more workloads.

13. The computer program product of claim 12, wherein a trigger signal for the end of the boost mode is set to a rule-based point in time after the core system has been initialized, and wherein the number of active members of the group is reset to a related regular grouping mode.

14. The computer program product of claim 11, wherein the increased processor utilization of the computer system includes the use of one or more processors, and wherein each of the one or more processors includes a plurality of core processors.

15. The computer program product of claim 14, wherein the increasing of the pacing setting includes increasing a number of parallel executing processors.

\* \* \* \* \*